Figure 1:
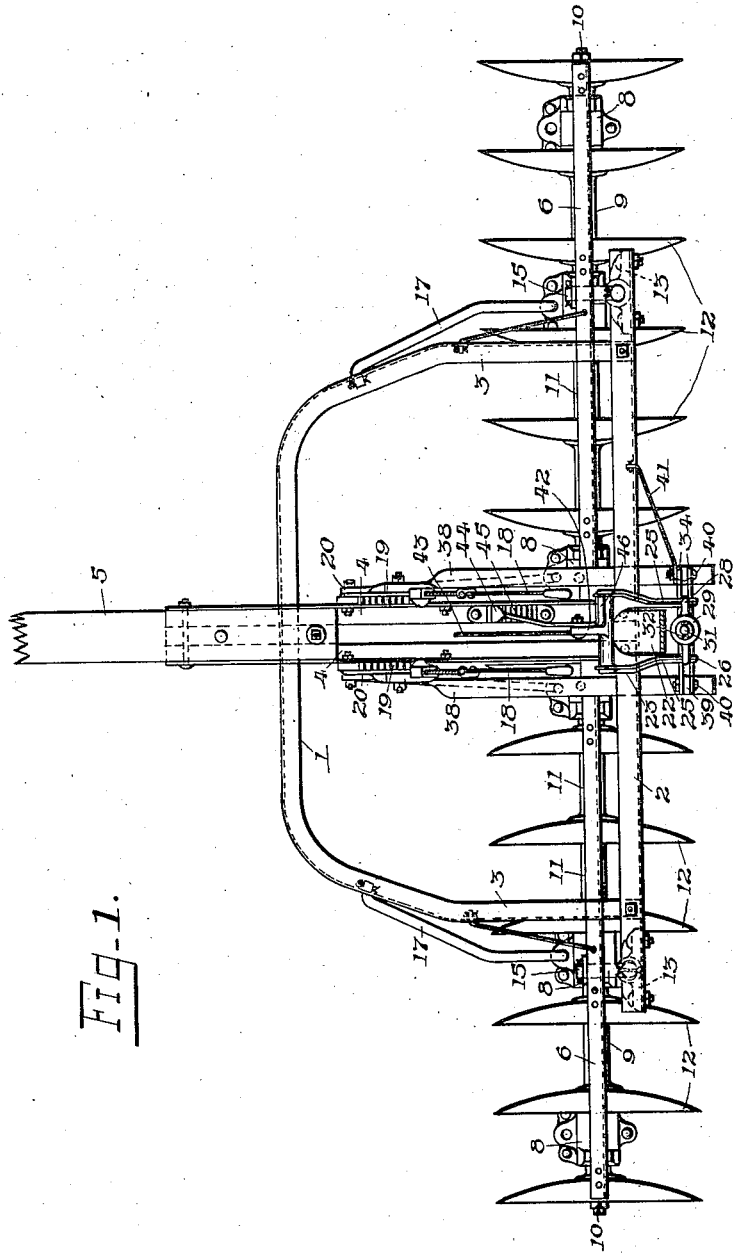

C. S. SHARP.
DISK HARROW.
APPLICATION FILED FEB. 25, 1911.

1,007,496.

Patented Oct. 31, 1911.
3 SHEETS—SHEET 1.

WITNESSES:
F.W. Hoffmeister
C. C. Palmer

INVENTOR.
Charles S. Sharp.
BY
ATTORNEY.

C. S. SHARP.
DISK HARROW.
APPLICATION FILED FEB. 25, 1911.
1,007,496.
Patented Oct. 31, 1911.
3 SHEETS—SHEET 2.
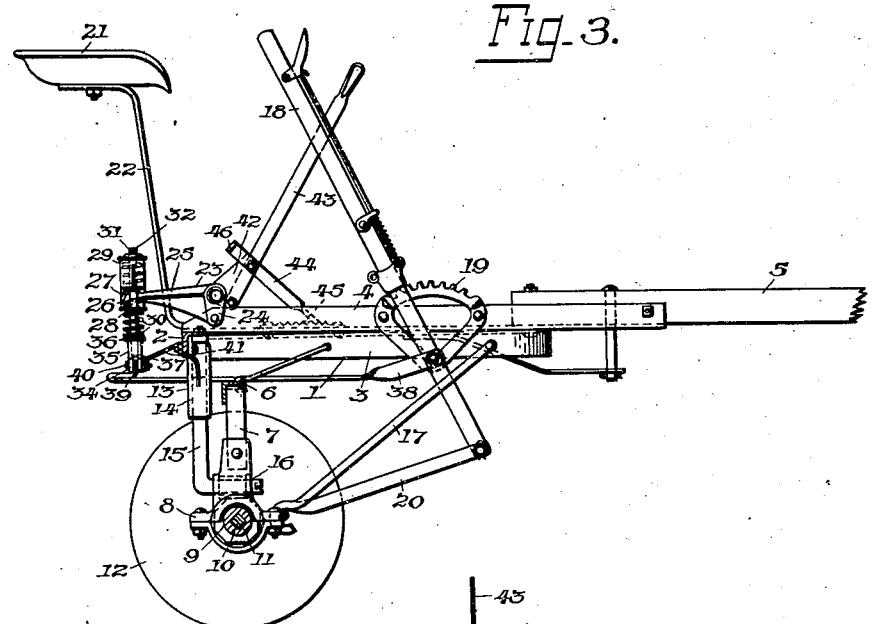
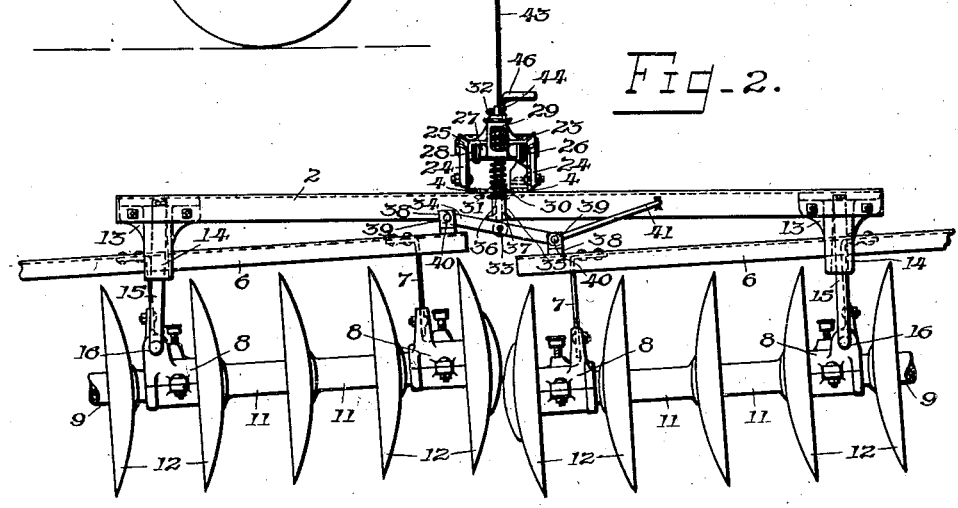
WITNESSES:
F. W. Hoffmeister
C. C. Palmer
INVENTOR.
Charles S. Sharp.
BY E. W. Burgess
ATTORNEY.

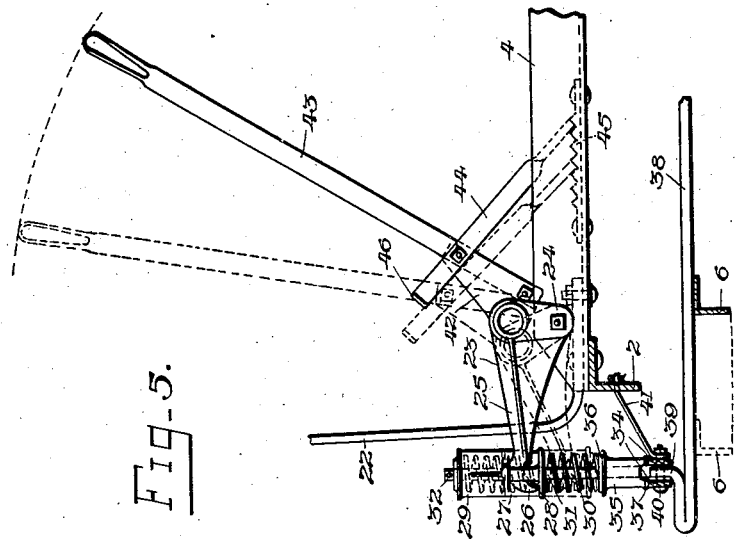

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

DISK HARROW.

1,007,496.  Specification of Letters Patent.  Patented Oct. 31, 1911.

Application filed February 25, 1911. Serial No. 610,713.

*To all whom it may concern:*

Be it known that I, CHARLES S. SHARP, a citizen of the United States, residing at Auburn, in the county of Cayuga and State of New York, have invented certain new and useful Improvements in Disk Harrows, of which the following is a specification.

My invention relates to disk harrows of the adjustable gang class, wherein two separate gangs of disks are flexibly connected with a draft frame in a manner permitting adjustment thereof relative to the line of draft, and a rocking movement about an axis arranged in the direction of the line of draft for the purpose of allowing the gangs to follow any irregularities in the surface of the ground; the object of my invention being to provide improved means for yieldingly pressing the inner adjacent ends of the gangs in contact with the soil. I attain this object by means of the mechanism illustrated in the accompanying drawings, in which—

Figure 1 is a top plan view of a harrow having my invention forming a part thereof; Fig. 2 is a rear end elevation of part of Fig. 1; Fig. 3 is a side elevation of Fig. 2; Fig. 4 is an enlarged rear elevation of part of Fig. 2; and Fig. 5 is a side elevation of Fig. 4.

The same reference numerals designate like parts throughout the several views.

1 represents a U-shaped draft frame having a transverse bar 2 secured to the rearwardly extending side members 3 thereof, and 4 represents longitudinally arranged draft frame members having their forward ends secured to the transverse portion of the U-shaped draft frame and their rear ends to the transverse bar 2, the members 4 being spaced apart and receiving between their forward ends a draft tongue 5.

6 represents gang frame members oppositely disposed and having depending bars 7 secured thereto, the lower ends of the bars being secured to bearing boxes 8 having gang axles 9 journaled therein, the axles including rods 10 and the usual spacing thimbles 11 mounted thereon, and between which the disks 12 are clamped.

13 represents brackets secured to opposite ends of the transverse bar 2 of the draft frame and having depending socket members 14 adapted to receive the upper ends of gang supporting bars 15 in a manner permitting said bars to swing transversely at their lower ends relative to the line of draft, the lower ends being turned forward and received by openings 16 in the intermediate bearing boxes of each gang, the openings being arranged at right angles with the gang axles and permitting the gangs to rock about the axes of the forwardly turned portions of the supporting bars.

17 represents draft links upon opposite sides of the draft frame having their forward ends pivotally connected with the side members of the draft frame and their rear ends with the intermediate bearing boxes forward of the axles.

18 represents hand levers, one for each gang, pivotally connected intermediate their ends with the lower sides of toothed sector brackets 19 that are secured to the draft frame members 4, the levers being provided with a common form of thumb lever detent mechanism adapted to retain the levers in adjusted relation with said toothed sectors, the lower ends of the levers being pivotally connected with the inner bearing boxes of each gang by means of links 20 whereby the operator, by manipulating the hand levers, may vary the angle of the gangs relative to the line of draft, and 21 represents an operator's seat supported by a spring 22.

23 represents a rocking bracket having depending ear portions 24, by means of which the bracket is pivotally connected with the rear ends of the draft frame members 4.

25 represent arms integral with the bracket and extending rearward are provided at their rear ends with hooked portions 26 that are received by openings 27 in loop members 28 upon opposite sides of a cylindrical cup 29. A compression spring 30 is received by the cup, and 31 represents a link surrounded by the spring, the upper end of the link being slidably received by an opening in the upper wall of the cup and provided with a retaining key 32, the lower end of the link being pivotally connected by means of a pin 33 with the middle portion of two short transversely arranged rocker bars 34 upon opposite sides of the link, and 35 represents a contact member slidably received by the lower end of the link, having a head portion 36 engaging with the compression spring, and curved bearing portions 37 at its lower end adapted to contact with the upper edges of the rocker bars.

38 represents pressure bars having their forward ends pivotally connected with the sector brackets 19 and extending rearward have their body portions in slidable engagement with the upper surfaces of the gang frame members, and their rear ends turned upward at 39 and pivotally connected with the opposite ends of rocker bars 34 by means of pins 40, and 41 represents a link having an eye at one end adapted to receive one of the pins 40, and its opposite end pivotally connected with the draft frame member 2 in a manner to resist a lateral swing of the disk gangs. An arm 42 extends forward and upward from the rocking bracket 23, and secured thereto is a hand lever 43 that may be manipulated by the operator for the purpose of throwing more or less pressure upon the inner ends of the gang frames through the intermediacy of the compression spring and its associated mechanism.

44 represents a dog pivotally connected with the hand lever, having its forward end adapted to engage with a toothed plate 45 secured to one of the bars 4 in a manner to secure the rocking bracket in any position of adjustment, and its rear end provided with a treadle portion 46 within convenient reach of the operator, whereby he may control the movement of the dog.

What I claim as my invention, and desire to secure by Letters Patent, is:

1. A disk harrow including, in combination, a draft frame, two disk gang frames flexibly connected with said draft frame in a manner permitting said gang frames to turn about vertical and horizontal axes, pressure bars having their forward ends pivotally connected with said draft frame and their body portions slidably engaging with said gang frames, and a rocker bar having its opposite ends pivotally connected with the rear adjacent ends of said pressure bars.

2. A disk harrow including, in combination, a draft frame, two disk gang frames flexibly connected with said draft frame in a manner permitting said gang frames to turn about vertical and horizontal axes, pressure bars having their forward ends pivotally connected with said draft frame and their body portions slidably engaging with said gang frames, a rocker bar having its opposite ends pivotally connected with the rear adjacent ends of said pressure bars, and a link having one end pivotally connected with one end of said rocker bar and extending laterally therefrom is pivotally connected at its opposite end with said draft frame.

3. A disk harrow including, in combination, a draft frame, two disk gang frames flexibly connected with said draft frame in a manner permitting said gang frames to turn about vertical and horizontal axes, pressure bars having their forward ends pivotally connected with said draft frame and their body portions slidably engaging with said gang frames, a rocker bar having its opposite ends pivotally connected with the rear adjacent ends of said pressure bars, and a spring pressure mechanism connecting the middle portion of said rocker bar with said draft frame.

4. A disk harrow including, in combination, a draft frame, two disk gang frames flexibly connected with said draft frame in a manner permitting said gang frames to turn about vertical and horizontal axes, pressure bars having their forward ends pivotally connected with said draft frame and their body portions slidably engaging with said gang frames, a rocker bar having its opposite ends pivotally connected with the rear adjacent ends of said pressure bars, a rocking bracket pivotally mounted upon said draft frame and having arms extending rearward therefrom, a compression spring interposed between said arms and said rocker bar, and means for rocking said bracket in a manner to apply more or less pressure to said rocker bar.

5. A disk harrow including, in combination, a draft frame, two disk gang frames flexibly connected with said draft frame in a manner permitting said gang frames to turn about vertical and horizontal axes, pressure bars having their forward ends pivotally connected with said draft frame and their body portions slidably engaging with said gang frames, a rocker bar having its opposite ends pivotally connected with the rear adjacent ends of said pressure bars, a rocking bracket pivotally mounted upon said draft frame and having arms extending rearward therefrom, a cylindrical cup having loop portions upon opposite sides thereof, the rear ends of said arms being received by said loops, a link having its lower end pivotally connected with said rocker bar and its opposite upper end slidably connected with the upper wall of said cup, a compression spring surrounding said link and operative between the upper wall of said cup and said rocker bar, and means for rocking said bracket in a manner to apply more or less pressure to said rocker bar.

6. A disk harrow including, in combination, a draft frame, two disk gang frames flexibly connected with said draft frame in a manner permitting said gang frames to turn about vertical and horizontal axes, pressure bars having their forward ends pivotally connected with said draft frame and their body portions slidably engaging with said gang frames, a rocker bar having its opposite ends pivotally connected with the rear adjacent ends of said pressure bars, a rocking bracket pivotally mounted upon said draft frame and having arms extending rearward therefrom, a compression spring interposed between said arms and said rocker bar, a hand lever secured to said rocking bracket, a dog pivotally mounted on said lever, and a toothed plate secured to said draft frame, said dog adapted to engage with said plate to hold said bracket in adjusted position in a manner to apply more or less pressure to said rocker bar.

CHARLES S. SHARP.

Witnesses:
K. T. ELLIOTT,
C. W. EMBODY.